UNITED STATES PATENT OFFICE.

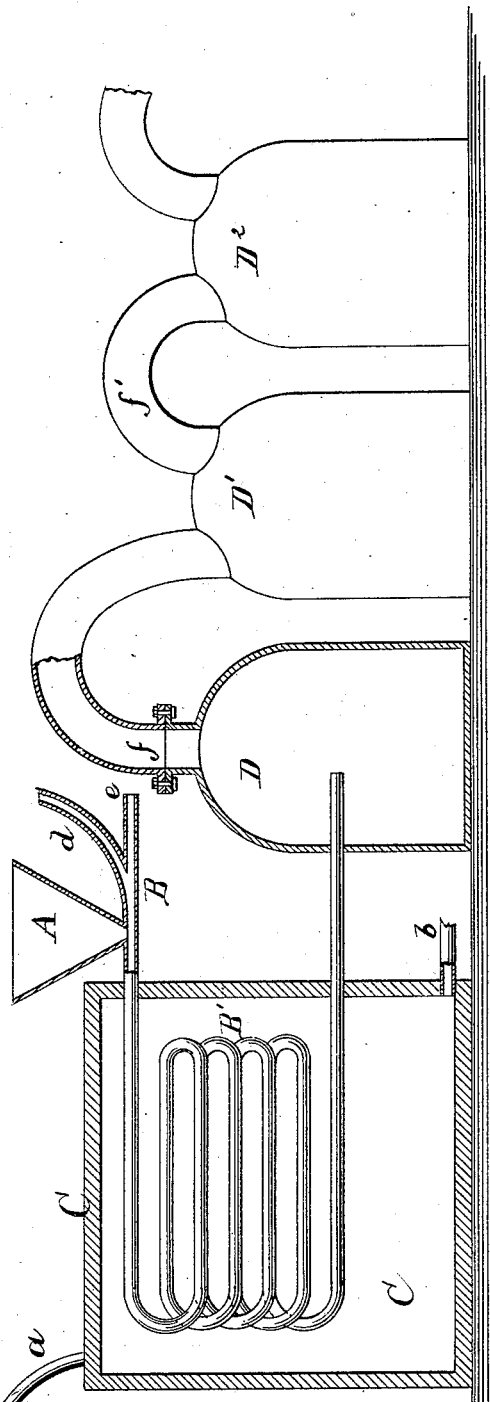

THOMAS G. WALKER, OF MORRISTOWN, NEW JERSEY.

OFFAL-DRIER.

SPECIFICATION forming part of Letters Patent No. 285,187, dated September 18, 1883.

Application filed June 29, 1883. (No model.)

*To all whom it may concern:*

Be it known that I, THOMAS GEORGE WALKER, of Morristown, in the county of Morris and State of New Jersey, have invented a new and Improved Apparatus for and Process of Drying Animal and other Substances, of which the following is a specification.

This invention relates to an improvement in means for drying tankage and other animal or vegetable substances, so that they may be utilized in the dry condition for fertilizing purposes or otherwise. By "tankage" is understood the offal in slaughter-houses which is not useful for purposes of food.

The invention consists in passing such animal or vegetable substances, in presence of steam and air, into a heated coil, in which the air absorbs moisture from such tankage or other animal or vegetable substance, and from which the dry residue is deposited into a suitable receiver.

In the drawing, the letter A represents a hopper or other vessel for receiving the tankage or other animal or vegetable substance. This hopper sets on a pipe, B, which leads into a heating-chamber, C, and forms within the same a coil, B', issuing therefrom finally as an ordinary pipe, and entering the receiving-vessel D. The chamber C is by preference heated by means of steam, which is let into it through a pipe, $a$, and which escapes therefrom through another pipe, $b$.

On the pipe B, near the hopper A, is a branch, $d$, which communicates with a steam-supply pipe, and another branch, $e$, which communicates with the atmosphere.

The tankage is put into the hopper A, and steam is then forced into the branch $d$, thereby also through the pipe B. This steam, by suction, causes a supply of air to enter the pipe B through the branch $e$; or, if desired, air may be forced by special means into the branch $e$, and thence through the pipe B. The mixture of tankage, steam, and air passes through the heated coil B', and in this heated coil the air will absorb moisture contained in the tankage, the steam being mainly used as a propelling vehicle. The dried result of this process will finally enter the chamber D, while the gaseous contents will pass out through a neck, $f$, of that chamber, either into another similar chamber, D', and thence by a neck, $f'$, into another chamber, $D^2$, and so forth, or directly into the air, the object of the sundry chambers D D' $D^2$ being to collect whatever dust may be carried by the escaping air and steam. It is essential that the air which passes through the coil B' should be kept at such a temperature as not to reach the point at which the tankage or other material to be dried, if combustible, would ignite with the oxygen of the air. It should be kept at such a temperature as to cause the watery particles in the tankage or other substance to turn into vapor; hence it should be heated to above 212° Fahrenheit. At such temperature the air will absorb a considerable portion of the vapor; but by all means the temperature should be maintained between 212° and the point of ignition of the material treated. In order to get at a definite degree of heat, which can be maintained even throughout, the steam-box C is deemed preferable to a furnace heated with an open flame, because in the latter it would be almost impossible—at any rate exceedingly difficult—to keep the contents of the coil B' from becoming overheated at any one time and place.

It will be seen that the process described is continuous. A new charge of air constantly meets a new charge of tankage, and both are kept moving in the heated coil by an ever new charge of steam.

I do not claim treating tankage by steam in a closed vessel. Such a process is limited to a given quantity of tankage, and depends entirely upon the action of the steam on the tankage, while my process is continuous, the steam being mainly the moving vehicle and the air the absorbing medium for the moisture.

I claim—

1. The process described of treating animal or vegetable matter, which process consists in forcing such animal or vegetable matter, by means of a current of steam and in the presence of a current of air, through a coil which is exposed to heat, substantially as described, and for the purpose of rendering said process continuous, as specified.

2. The combination of the pipe B and its coil B' with the steam-heater C, supply-hopper A, steam-pipe $d$, and air-pipe $e$, substantially as herein shown and described.

THOS. GEO. WALKER.

Witnesses:
HARRY SMITH,
GUSTAVE SCHNEPPÉ.